United States Patent
Averboch et al.

(10) Patent No.: US 11,238,132 B2
(45) Date of Patent: *Feb. 1, 2022

(54) METHOD AND SYSTEM FOR USING EXISTING MODELS IN CONNECTION WITH NEW MODEL DEVELOPMENT

(71) Applicant: Kasisto, Inc., New York, NY (US)

(72) Inventors: Guillermo Averboch, New York, NY (US); Sasha Caskey, New York, NY (US); Yi Ma, New York, NY (US); Sathish Pammi, East Newark, NJ (US); Robert Stewart, Huntington, NY (US)

(73) Assignee: Kasisto, Inc., New York, NY (US)

( * ) Notice: Subject to any disclaimer, the term of this patent is extended or adjusted under 35 U.S.C. 154(b) by 122 days.

This patent is subject to a terminal disclaimer.

(21) Appl. No.: 16/801,407

(22) Filed: Feb. 26, 2020

(65) Prior Publication Data

US 2020/0193330 A1    Jun. 18, 2020

Related U.S. Application Data

(63) Continuation of application No. 15/265,214, filed on Sep. 14, 2016, now Pat. No. 10,614,377.

(51) Int. Cl.
*G06N 5/04* (2006.01)
*G06N 3/08* (2006.01)
*G06Q 10/00* (2012.01)
*G06F 3/048* (2013.01)
*G06N 20/00* (2019.01)
*G06F 17/18* (2006.01)
*G06N 7/00* (2006.01)

(52) U.S. Cl.
CPC ............. *G06F 17/18* (2013.01); *G06N 7/005* (2013.01); *G06N 20/00* (2019.01)

(58) Field of Classification Search
CPC ......... G06N 20/00; G06N 7/005; G06F 17/18
USPC .................................................. 706/1–62; 1/1
See application file for complete search history.

(56) References Cited

U.S. PATENT DOCUMENTS

| | | | |
|---|---|---|---|
| 10,614,377 B2 * | 4/2020 | Averboch | G06F 17/18 |
| 2009/0222366 A1 | 9/2009 | Cao et al. | |
| 2009/0310816 A1 | 12/2009 | Freire et al. | |
| 2014/0017653 A1 | 1/2014 | Romney et al. | |
| 2014/0317031 A1 | 10/2014 | Babenko et al. | |
| 2015/0206158 A1 | 7/2015 | Sebastian et al. | |
| 2015/0379427 A1 | 12/2015 | Dirac et al. | |

(Continued)

OTHER PUBLICATIONS

Nate Derby, "Managing and Monitoring Statistical Models," SAS Global Forum 2013, Planning and Support, Paper 190-2013, Apr. 2013, pp. 1-13.

(Continued)

*Primary Examiner* — Brandon S Cole
(74) *Attorney, Agent, or Firm* — Ryan, Mason & Lewis, LLP (57) ABSTRACT

A method for model management includes receiving data on which to base a model, evaluating the received data against a plurality of existing models and data associated with each of the plurality of existing models, determining whether any of the plurality of existing models can be used as the model or as a basis to develop the model for the received data, and providing a user with the existing models that can be used as the model or as a basis to develop the model for the received data.

23 Claims, 8 Drawing Sheets

(56) References Cited

U.S. PATENT DOCUMENTS

2017/0011077 A1* 1/2017 Kypreos ................ G06Q 40/00
2017/0124474 A1   5/2017 Kashyap
2017/0161336 A1   6/2017 Dubey et al.
2017/0286038 A1* 10/2017 Li ............................ G06F 3/14

OTHER PUBLICATIONS

R. Chu et al., "Best Practices for Managing Predictive Models in a Production Environment," SAS Global Forum 2007, Data Mining and Predictive Modeling, Paper 076-2007, Apr. 2007, pp. 1-10.
Wikipedia, "Domain Adaptation," https://en.wikipedia.org/w/index.php?title=Domain_adaptation&printable=yes, Mar. 22, 2016, 3 pages.
J. Wei et al., "Dashboard Reports for Predictive Model Management," SAS Global Forum 2009, Business Intelligence User Applications, Paper 045-2009, Mar. 2009, pp. 1-12.

* cited by examiner

METHOD AND SYSTEM FOR USING EXISTING MODELS IN CONNECTION WITH NEW MODEL DEVELOPMENT

TECHNICAL FIELD

The field generally relates to model management and, in particular, to querying and determining whether existing models can be used in the development of models for newly acquired data.

BACKGROUND

In a world that is becoming increasingly dependent on artificial intelligence (AI), there is an increasing need to manage large sets of data, often with statistical based methods, such as statistical models. When trying to model a new problem or class of problems, new data sets can be created which may best represent the problem, and the new data sets are sent through algorithms to learn patterns from the data, and create the model. Instead of creating new data sets, the model development process may be improved if one or more existing sets of data that closely represent the new problem attempting to be modeled can be used to develop the model.

SUMMARY

According to an exemplary embodiment of the present invention, a method for model management comprises receiving data on which to base a model, evaluating the received data against a plurality of existing models and data associated with each of the plurality of existing models, determining whether any of the plurality of existing models can be used as the model or as a basis to develop the model for the received data, and providing a user with the existing models that can be used as the model or as a basis to develop the model for the received data.

According to an exemplary embodiment of the present invention, a system for model management comprises one or more processing devices operatively connected via a communications network, an input/output module, implemented by the one or more processing devices, wherein the input/output module is configured to receive data on which to base a model, and a model controller, implemented by the one or more processing devices and operatively connected to the input/output module. The model controller is configured to receive the data on which to base the model from the input/output module, evaluate the received data against a plurality of existing models and data associated with each of the plurality of existing models, and determine whether any of the plurality of existing models can be used as the model or as a basis to develop the model for the received data. The plurality of existing models and data associated with each of the plurality of existing models are stored in a database operatively connected to and accessible by the model controller. The model controller is further configured to provide a user, via the input/output module, with the existing models that can be used as the model or as a basis to develop the model for the received data.

According to an exemplary embodiment of the present invention, an article of manufacture comprises a processor-readable storage medium having encoded therein executable code of one or more software programs, wherein the one or more software programs when executed by one or more processing devices implement the steps of receiving data on which to base a model, evaluating the received data against a plurality of existing models and data associated with each of the plurality of existing models, determining whether any of the plurality of existing models can be used as the model or as a basis to develop the model for the received data, and providing a user with the existing models that can be used as the model or as a basis to develop the model for the received data.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION

Exemplary embodiments of the invention will now be discussed in further detail with regard to model management and, in particular, to querying and determining whether existing models can be used in the development of models for newly acquired data. This invention may, however, be embodied in many different forms and should not be construed as limited to the embodiments set forth herein.

As used herein, a network, can refer to, but is not necessarily limited to, a local area network (LAN), wide area network (WAN), cellular network, satellite network or the Internet. Network communication can be performed via one or more centralized servers or cloud data centers that receive, analyze and send data to and from one or client devices, such as, for example, smart phones, tablets or other computing devices, that, by way of example, are part of the network.

The analysis of massive amounts of data may be required in order develop models in accordance with embodiments of the present invention. Such analysis of these data sets may require processing, for example, tens or hundreds of terabytes of data or more. Such large data sets may be referred to herein as "big data." A data set characterized as big data may be so large such that, for example, it is beyond the capabilities of commonly used software tools to manage/process the data, or at least to do so within a reasonable time frame.

Statistical models, such as, for example, predictive models can be important organizational assets, wherein organizations (e.g., businesses) may use the predictive models to achieve competitive advantages. Models comprise analytic approaches to organizational problems that can be solved quantitatively.

In accordance with an embodiment of the present invention, a system and/or apparatus for model development includes a specialized database to store existing models and their corresponding data for a particular organization, so that when a new problem needs to be modeled, a model development engine (also referred to herein as a model controller (MC)) of the system and/or apparatus can query and retrieve the existing models from the database, and make a determination which, if any, of the existing models and their associated data are close enough to be used for the development of a model for the new problem. In accordance with an embodiment of the present invention, the determination of which, if any, of the existing models and their associated data are close enough is based on a probabilistic statistical analysis, where the model controller determines whether a given existing model meets or exceeds a predetermined probability that the given existing model is useable as the model for the new problem or as a basis to develop the model for the new problem.

In accordance with an embodiment of the present invention, the probabilistic statistical analysis, to determine which, if any, of the existing models and their associated data are close enough, is performed using specialized language technology components, including, but not necessarily limited to feature extraction modules, natural language processing (NLP) and natural language understanding (NLU) components, and/or other specialized modules that use machine learning approaches, including, but not necessarily limited to, Maximum Entropy Classification, Conditional Random Fields, and Deep Neural Networks (DNNs). With the help of feature extraction, the machine learning algorithms can be used to predict a class of a given new data set and, as a result, provide probability. The probability represents how closely related the existing models are to the new data set.

Based on the closeness of an existing model to the new problem, the model controller can recommend that one or more existing models and their associated data be used as is to model the new problem, or modified in some manner into a new model or class in order to model the new problem.

As used herein, a "new class" represents a new problem and corresponding data sets, and a "new model" refers to a probabilistic model, which is a result of training old classes together with a new class, using machine-learning techniques. A model includes a set of classes. Adding or removing a class creates a separate model.

Once developed, a resulting new model or new class could be returned to the specialized database and added to the pool of existing models and data for storage and future use when evaluating whether subsequent new problems can rely on existing models and their associated data.

In accordance with embodiments of the present invention, a process of re-using existing data and models is made possible by, for example, examining a new problem against a database of all previously modeled data for a particular organization or group of organizations, returning the closest matched models to the new problem in the existing model database, allowing users to choose to extend existing models and which of the existing models to extend, and/or choose to create new models not based on the existing models, and tracking all of the data associated with each developed model.

As used herein, the term "real-time" can refer to output within strict time constraints. Real-time output can be understood to be instantaneous or on the order of milliseconds or microseconds. Of course, it should be understood that depending on the particular temporal nature of the system in which an embodiment of the invention is implemented, other appropriate timescales that provide at least contemporaneous performance and output can be achieved.

As used herein, "natural language processing (NLP)" can refer to interactions between computers and human (natural) languages, where computers are able to derive meaning from human or natural language input, and respond to requests and/or commands provided by a human using natural language.

As used herein, "natural language understanding (NLU)" can refer to a sub-category of natural language processing in artificial intelligence (AI) where natural language input is disassembled and parsed to determine appropriate syntactic and semantic schemes in order to comprehend and use languages. NLU may rely on computational models that draw from linguistics to understand how language works, and comprehend what is being said by a user.

As used herein, "image processing" can refer to the extraction of one or more features and/or characteristics of one or more items that are the subject of one or more images (e.g., products, people, animals, locations, dwellings, etc.) from a visual representation of the items using, for example, digital image processing (DIP), digital image capture (DIC) and/or magnetic resonance imaging (MM) techniques.

As used herein, "sound processing" can refer to the extraction of one or more features and/or characteristics of one or more items that are the subject of one or more sounds (e.g., products, people, animals, locations, dwellings, etc.) from an audio representation (e.g., audio signal) of the items using, for example, digital or analog signal processing.

Figure 1A:
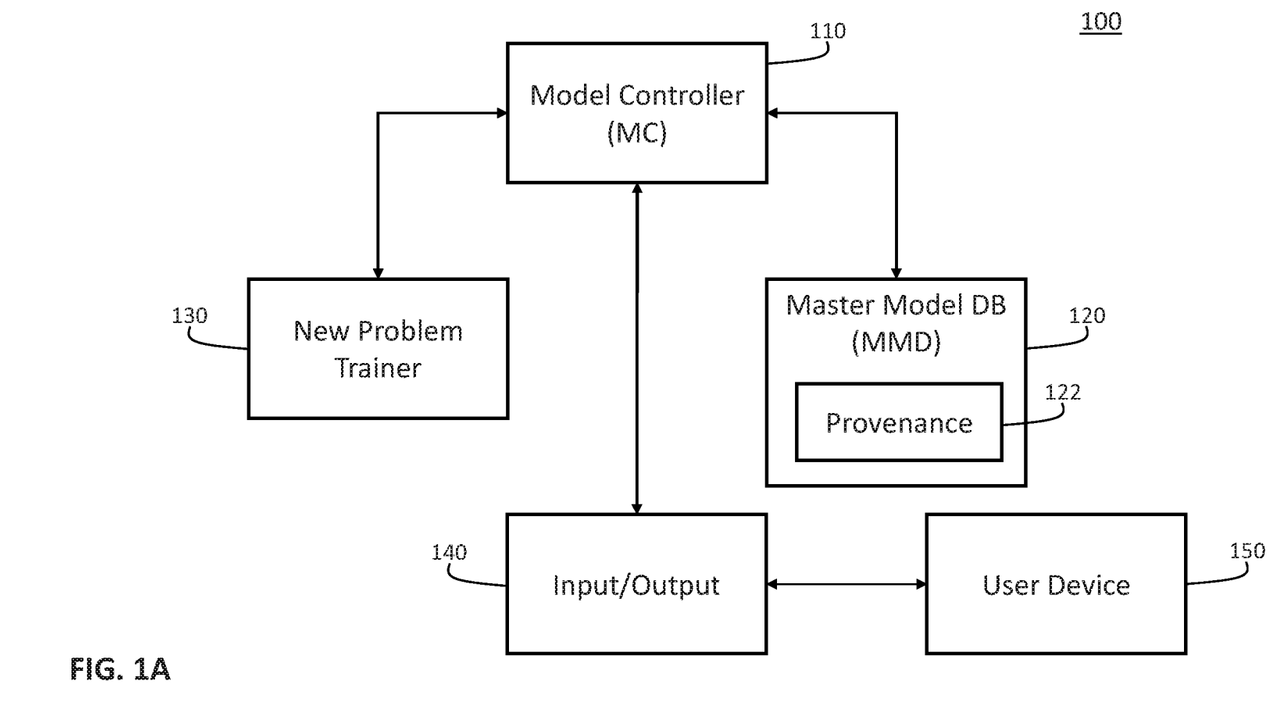
FIG. 1A is a block diagram of a system for model management, according to an exemplary embodiment of the present invention.
Figure 1B:
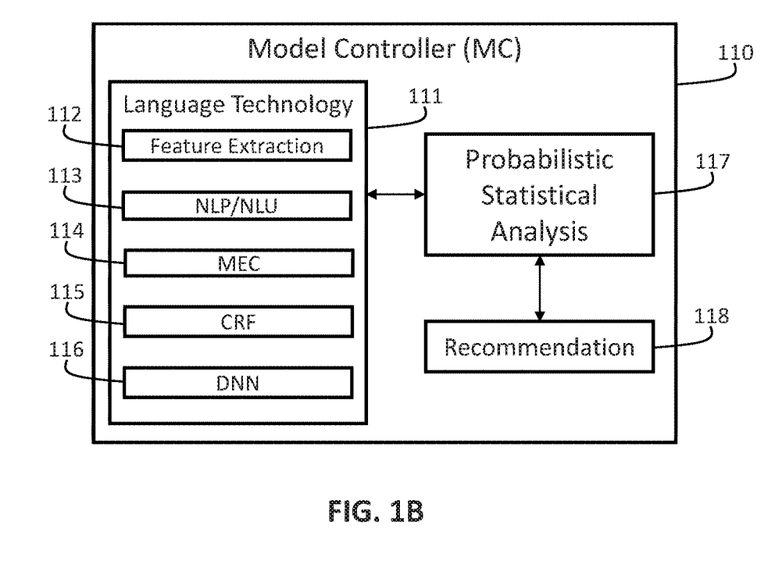
FIG. 1B is a block diagram of a model controller in a system for model management, according to an exemplary embodiment of the present invention.
Figure 1C:
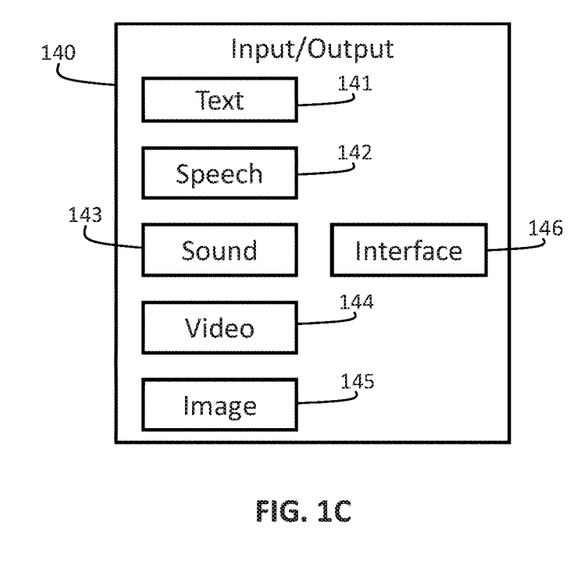
FIG. 1C is a block diagram of an input/output module in a system for model management, according to an exemplary embodiment of the present invention.

FIG. 1A is a block diagram of a system for model management, according to an exemplary embodiment of the present invention. As shown in FIGS. 1A, 1B and 1C by lines and/or arrows, or by shapes within other shapes, the components of the system 100, or elements of each component, are operatively connected to each other via, for example, physical connections, such as wired and/or direct electrical contact connections, and/or wireless connections, such as, for example, WiFi, BLUETOOTH, IEEE 802.11, and/or networks, including but not limited to, a local area network (LAN), wide area network (WAN), cellular network, ad hoc networks, wireless ad hoc network (WANET), satellite network or the Internet.

By way of non-limiting example, in accordance with an embodiment of the present invention, referring to FIG. 1A, a system for model management 100 includes a model controller 110 operatively connected to a master model database 120, a new problem trainer 130 and an input/output module 140 operatively connected to at least one user device 150, such as, for example, a smart phone, tablet or other computing device. Each of the components 110, 120, 130, 140 and 150 of the system 100 can be implemented by one or more processing devices.

An input/output module 140 receives data on which to base a model. The data received by the input module 140 can be, for example, in the form of text, speech, sound or image input. Referring to FIG. 1C, the input/output module 140 is equipped with one or more text, speech, sound, video and/or image processors 141, 142, 143 144, and 145, which can be used to perform text, speech, sound, image and/or video processing in order to extract features or trends from certain types of input, which can be used to define a problem on which the model will be based. For example, input processing can include NLP and NLU to extract key ideas from spoken words or documents, map/reduce techniques to extract information from documents by transforming content into key/value components, and clustering. Other methods of parsing through different forms of input can include, but are not necessarily limited to, image, sound and video processing that can extract other different forms of multimodal input.

The model controller 110 receives the processed input data on which to base the model from the input/output module 140, and evaluates the received data against a plurality of existing models and data associated with each of the plurality of existing models from the master model database 120. The database 120 includes statistical models trained from existing data resources, and may facilitate rapid development of new models for new problems when the new models are based on the existing statistical models in the database 120. The database 120 keeps track of all models and corresponding data associated with the existing problems.

Referring to FIG. 1B, the model controller 110 includes a probabilistic statistical analysis module 117 which, in accordance with an embodiment of the present invention, uses existing data sets to create class models using probabilistic analysis. For example, in a data-driven question and answering system, each question-answer contains a data set of many sentences a user could possibly ask the system for getting a corresponding answer. For such scenarios, a maximum entropy classification (MEC) module 114 uses maximum entropy based machine learning approaches create a set of models. The database 120 is a specialized custom database, which includes the datasets and corresponding models. These models are used to identify the problems using model classification probabilities.

The input/output module 140 may comprise a web-based service, including an appropriate user interface 146, that supports user interaction via, for example, user devices 150, such as, for example, smart phones, tablets or other computing devices, that, by way of example, are part of a network. As noted herein, the network, which can connect one or more components of the system to each other, can refer to, but is not necessarily limited to, a LAN, WAN, cellular network, satellite network or the Internet.

When the model controller 110 receives the processed input data on which to base the model from the input/output module 140, the model controller 110 accesses the database to determine whether any of the plurality of existing models can be used as the model or as a basis to develop the model for the received data corresponding to the new problem. The model controller 110 includes the probabilistic statistical analysis module 117, which is configured to perform probabilistic statistical analysis to determine whether any of the plurality of existing models can be used as the model or as a basis to develop the model for the received data. In accordance with an embodiment of the present invention, the probabilistic statistical analysis determines whether a given existing model meets or exceeds a predetermined probability that the given existing model is useable as the model or as a basis to develop the model for the received data.

Using the existing models in the model database 120, the probabilistic statistical analysis module 117 determines, based on class probabilities in a statistical analysis, whether a new data set requires constructing a new model or using an existing model. The probabilistic statistical analysis determines which, if any, of the existing models and their associated data are close enough to be used for the development of a model for the new problem. The probabilistic statistical analysis is performed using specialized language technology components 111 that may rely on AI, including, but not necessarily limited to a feature extraction component 112, an NLP/NLU component 113, a maximum entropy classification (MEC) module 114, a conditional random fields (CRF) module 115 and a deep neural networks (DNNs) module 116.

The feature extraction component 112 extracts meaningful cues from raw data and transforms the data into a structure that machine learning algorithms can understand. Machine learning components use the transformed data from the feature extraction component 112 to train a new model or use an existing model. In accordance with an embodiment of the present invention, the specialized language technology components 111 of the model controller 110 further include, but are not necessarily limited to, machine learning components, such as the NLP/NLU component 113, and, to support NLP/NLU, the maximum entropy classification (MEC) module 114 using MEC, the conditional random fields (CRF) module 115 using CRF, and the deep neural networks (DNNs) module 116 using deep learning techniques. The NLP/NLU component 113 comprises rule-based analysis modules, machine learning modules, or both rule-based analysis and machine learning modules depending on the role of NLP/NLU in a target application. With the help of feature extraction, the machine learning algorithms are used to predict a class of a given new data set and, as a result, provide probability. The probability represents how closely related the existing models are to the new data set.

Based on the probabilistic analysis, the model controller 110 provides a user, via the input/output module 140, with the existing models that can be used as the model or as a basis to develop the model for the received data. In providing a user with the existing models that can be used as the model or as a basis to develop the model, the model controller 110 includes a specialized recommendation component 118 that can recommend models to be used as the model, recommend two or more of the existing models that can be merged to develop the model for the received data, and/or recommend one or more of the existing models that can be divided to develop the model for the received data. When recommending one or more of the existing models that can be divided, the recommendation component 118 uses one or more clustering algorithms by looking into highly correlated problem classes.

According to an embodiment of the present invention, the model controller 110 includes a customized recommendation system for a user, which makes decisions based on a probabilistic analysis, and with the help of clustering algorithms. A user can decide, based on the probabilistic information provided by model controller 110, for example, whether to build a new class model by dividing existing models and their associated data, build a new class model by merging correlated models and data, or build a completely new class model.

In accordance with an embodiment of the present invention, in order to make appropriate recommendations, the model controller 110 performs specialized analysis including, but not necessarily limited to, analyzing certain probabilistic parameters, such as prediction confidence scores, and semantic and meaning correlations between existing data sets and newly given data. The model controller 110 can make determinations on possible options of using existing models, merging existing models or dividing existing models by using confidence thresholds for interpreting correlations between existing models and received data. For example, if the model controller 110 finds that correlations between existing models and received data are less than a minimum confidence threshold, the model controller 110 recommends creating a new model. In the case of a high correlation between an existing model and received data (e.g., greater than or at a confidence threshold for high correlation), the model controller 110 recommends using an existing model. If the correlation is medium or high with multiple class models (e.g., greater than or at confidence thresholds for correlations with multiple models), the model controller 110 recommends merging or dividing such correlated models.

In connection with dividing or merging class models and data, the model controller 110 makes recommendations to merge or divide based on semantic or meaning relevancy between class models and associated data sets, by using machine learning techniques, such as deep parsing for natural language processing.

Depending on the recommendation of the model controller 110, a user may choose different options when proceeding to develop a model for newly received data. For example, in response to a recommendation to use an existing model as the model, a user can select to use a particular existing model as the model. In response to a recommendation to merge, a user can select two or more of the existing models to be merged to develop the model for the received data. In the case of merging, the model controller 110 marks data corresponding to each of the selected models with a corresponding original model category, and merges the data corresponding to the selected models. The results of the marking are stored in a provenance component 122 included in the database 120.

In a non-limiting illustrative example, in a question and answering system, each question may have a unique answer, but there may be alternative ways of asking the same question. When there are two existing questions that are similar, or a newly added question (problem) is similar to an existing question, the model controller 110 merges the similar questions and their data to create a combined set and in a single model to reduce ambiguity in the system.

The model controller 110 relies on statistical probabilistic analysis to obtain objective measures for recommending merging or dividing models. Once a user or the system chooses to merge multiple models and data, the model controller 110 marks original labels of the models and data prior to the merger to maintain a history or provenance of events and creates the combined data and the corresponding model. The results of the marking are stored in a provenance component 122 included in the database 120.

In such scenarios, the data is merged after marking an original model category. Then, the original models are replaced by a new combined class model representing a merged class. The combined class model is obtained by retraining an entire classification model using a machine learning methodology.

In response to a recommendation to divide existing models, a user can select one or more of the existing models to be divided to develop the model for the received data. In the case of dividing, like with merging, the model controller 110 marks data corresponding to each of the selected models with a corresponding original model category, and divides the data corresponding to the selected models into a plurality of categories. The results of the marking are stored in a provenance component 122 included in the database 120.

In accordance with an embodiment of the present invention, the model controller 110 recommends the division of the data when the model controller 110 finds that the user merged two instances of highly uncorrelated data by mistake (i.e. a human error). The model controller 110 identifies such scenarios by using unsupervised clustering algorithms and its cluster probabilities. The model controller 110 also uses semantic/meaning correlations between the data before merging and after merging.

Once merging or dividing existing models is selected, in accordance with an embodiment of the present invention, the model controller 110 divides the merged or divided data into test data and training data, and trains the model for the received data. It is to be understood that although the model controller 110 is described as performing functions, such as dividing the merged or divided data into test and training data, and training the model, the embodiments of the invention are not necessarily limited thereto, and that other components, such as, for example, the new problem trainer 130 can be used to perform the functions of dividing the merged or divided data into test and training data, and training the model, or other functions.

Depending on the data, and the results of the probabilistic analysis, the model controller 110 may determine that none of the plurality of existing models can be used as the model or as a basis to develop the model for the received data, and that the model for the received data be developed independent of the plurality of existing models. Then, the new problem trainer 130, which is operatively connected to the model controller 110, collects crowdsourced data for the new model.

For example, a user may provide a new question and answer (i.e., a new problem) to the system. If there are no similar questions existing in the model database 120, the system creates a new class model. In such a scenario, the model controller 110 may not have enough data to build a new class model. According to an embodiment of the present invention, crowd-sourcing methodologies are used to create alternate questions for the new problem. For example, if the system determines that new questions are needed, the system can contact people via a public web service, including, for example, via social media, text messaging and/or email requesting that people provide alternate ways of asking the same question. People who contribute may be compensated. The system may automatically make such requests for alternate questions and automatically provide compensation to users upon receipt or acceptance of responses. The requests for alternate questions can be made in real-time once the model controller 110 determines that there is a need for alternate questions for the new problem.

In accordance with an embodiment of the present invention, the new problem trainer 130 divides the crowdsourced data into test data and training data, and trains the new model for the received data.

As an alternative to making recommendations for a user to choose different options, the model controller 110 can automatically determine how to develop a model for the newly received data (e.g., use an existing model as the model, merge or divide existing models, or create a new model) and automatically execute further processing based on the determination.

Depending on the data, and the results of the probabilistic analysis, the model controller 110 may be unable to make any recommendation regarding whether an existing model can be used as a model or as a basis to develop the model for newly received data or that none of the plurality of existing models can be used as the model or as a basis to develop the model for the received data. In a scenario where the results of the probabilistic analysis are inconclusive, the model controller 110 may request that a user carefully consider whether to use an existing model, merge or divide existing models to create another model, or create a new model independent of an existing model. According to an embodiment of the present invention, the model controller 110 provides a specialized recommendation to a user in this scenario. For example, the model controller 110 transmits to the user, via the input/output module 140 and a user device 150, what the model controller 110 determines to be the most useful and relevant data for the user to make an informed decision, including, but not limited to, class probabilities and semantic/meaning correlation scores.

Once models are developed using the processes herein, the developed models and their associated data are stored in the database 120 for subsequent processing as existing models. For example, according to an embodiment of the present invention, if some of the existing models in the database 120 comprise previously merged or previously divided data performed to develop earlier models, these existing models can be considered as existing model candidates when determining whether an existing model can be used as a model or as a basis to develop the model for newly received data.

In accordance with an embodiment of the present invention, the model controller 110 is configured to re-use models and measure new inputs (e.g., unseen events) against all models in the database 120 and suggest existing models that best match the new input(s). The model controller 110 allows for the creation of new models, tracks models and all the data associated with the models, and allows creating of new models by merging or dividing existing models.

According to an embodiment of the present invention, a new model can be created by creating a new label. A label is an indicator or name, for example, a hashtag, for representing a unique problem (or class) and its associated data. Creating a new label refers to creating an indicator or name to represent a new class model. Labels provide a methodology to keep track of the class models in the customized database 120. A label is an indicator that the system can use to retrieve all information associated with a problem, such as, for example, data and class model.

The system, in accordance with an embodiment of the present invention, maintains a dynamic set of labels in both the new and existing data examples. The dynamic set of labels keeps track of a history or provenance of events regarding how merging, dividing, or creating class models happens over time, and enables the system and a user to go back in the history to review provenance data and determine how model representation changed over time. The dynamic set of labels is maintained by a provenance component 122 included in the database 120. According to an embodiment of the present invention, the system updates the dynamic set of labels in real-time for each merging, dividing, or creating of class models.

Figure 2:
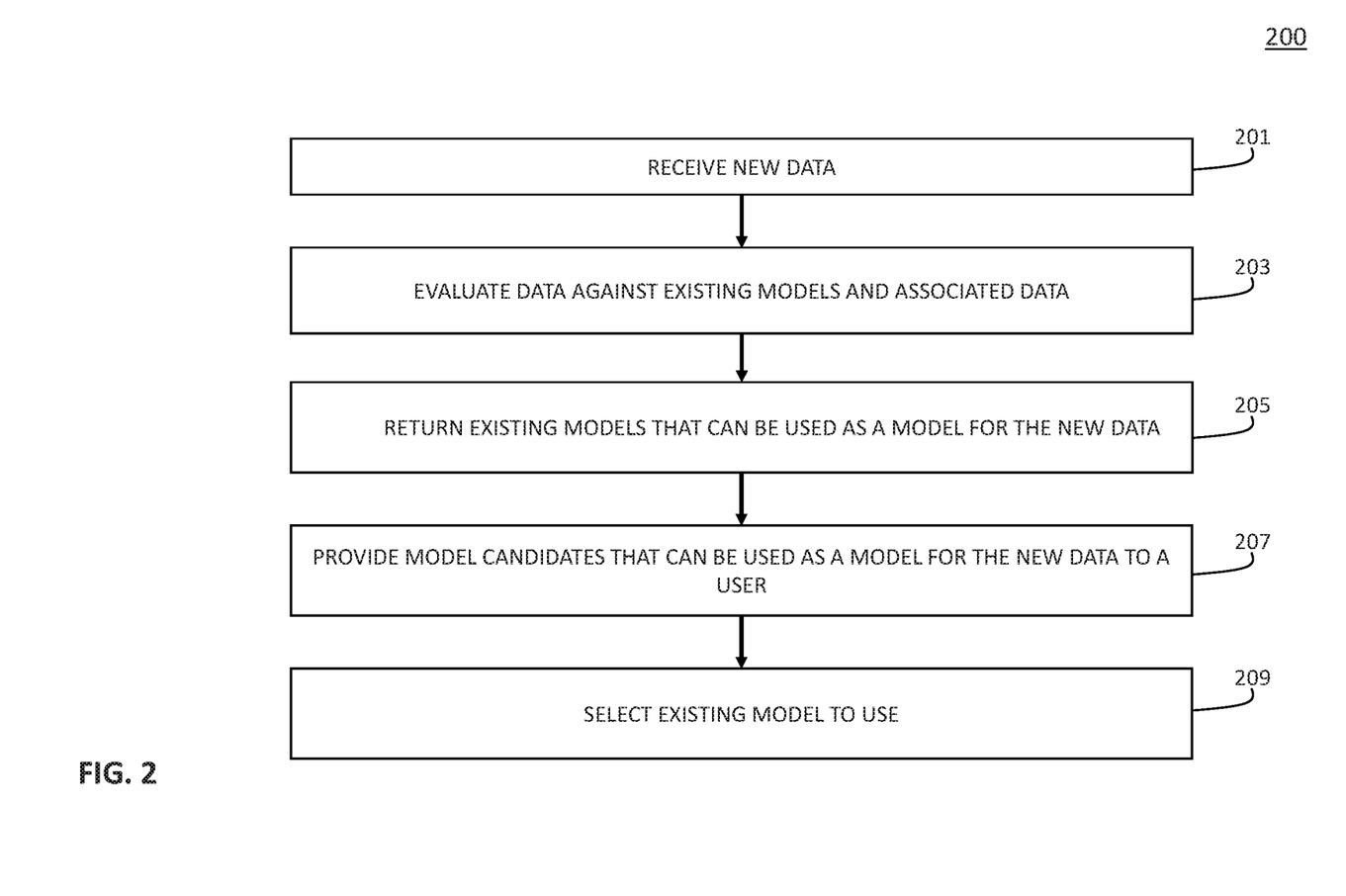
FIG. 2 is a flow diagram of a process for model management wherein using existing models is proposed, according to an exemplary embodiment of the invention.

FIG. 2 is a flow diagram of a process for model management wherein using existing models is proposed, according to an exemplary embodiment of the invention. Referring to FIG. 2, the process 200 includes, at block 201, receiving new data on which to base a model. The received data is evaluated against existing models and associated data (block 203), and based on, for example, probabilistic statistical analysis, existing models that can be used as a model for the new data are returned (block 205). The process further includes, at block 207, providing model candidates that can be used as a model for the new data to a user, and, at block 209, selecting an existing model to use from the candidates. Alternatively, a system may perform the selection of an existing model to use without user input.

Figure 3:
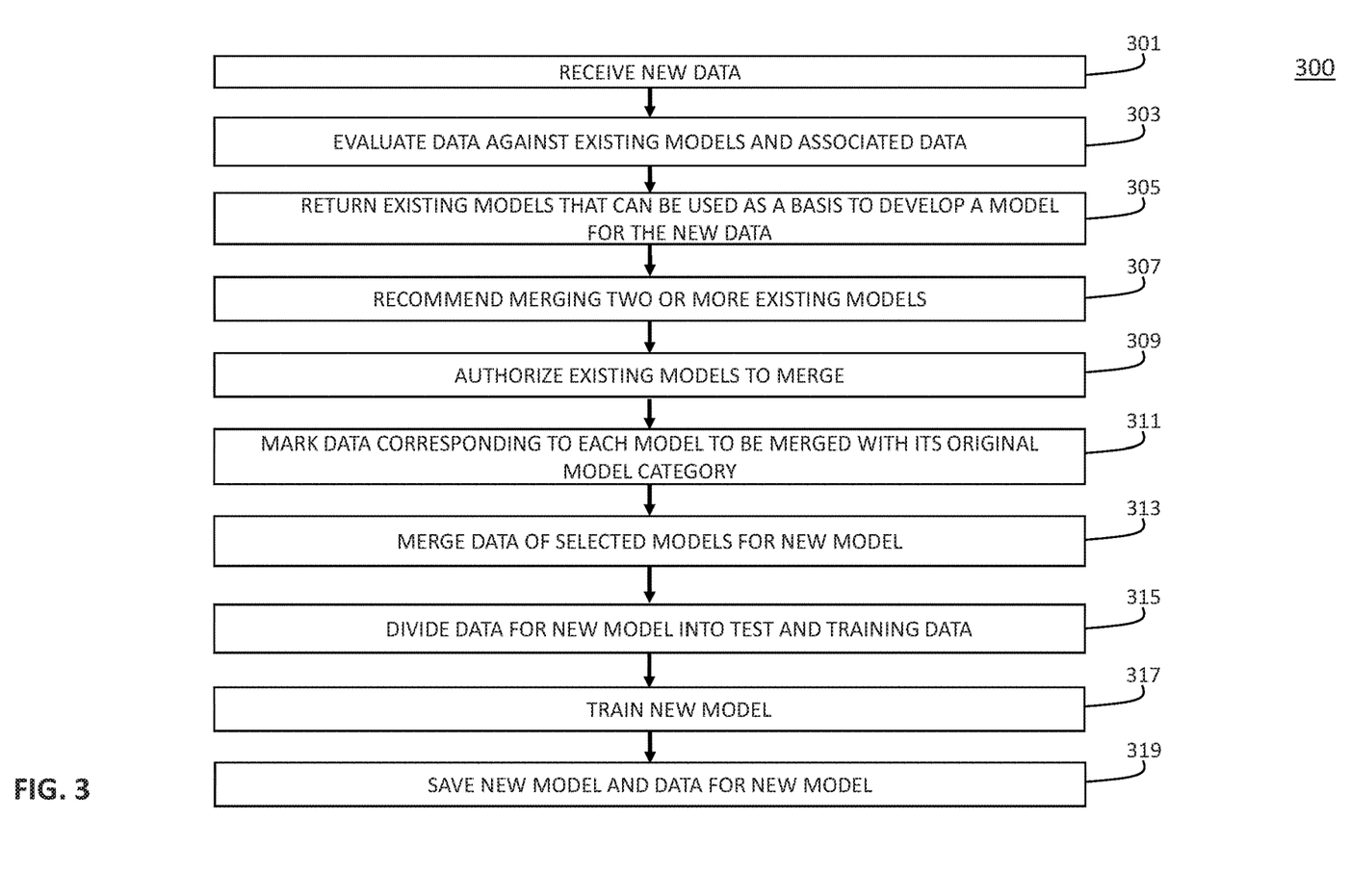
FIG. 3 is a flow diagram of a process for model management wherein merging of existing models is proposed, according to an exemplary embodiment of the invention.

FIG. 3 is a flow diagram of a process for model management wherein merging of existing models is proposed, according to an exemplary embodiment of the invention. Referring to FIG. 3, the process 300 includes, at block 301, receiving new data on which to base a model. The received data is evaluated against existing models and associated data (block 303), and based on, for example, probabilistic statistical analysis, existing models that can be used as a basis to develop a model for the new data are returned (block 305). Two or more existing models or respective candidate groups of two or more existing models are recommended for merger to develop a model for the new data (block 307). At block 309, a user may authorize which existing models to merge. Alternatively, a system may perform the selection of the existing models to merge without user input.

At block 311, the method further includes marking data corresponding to each model to be merged with its original model category, and at block 313, merging the data of the selected models for the new model. The merged data for new model is divided into test and training data (block 315), and the new model is trained based on the training data (block 317). For example, the model can be tailored using the training data and then evaluated against the test data. The trained new model and data are saved in a database for subsequent use when determining whether any of a plurality of existing models can be used as a model or as a basis to develop a model for received data (block 319).

Figure 4:
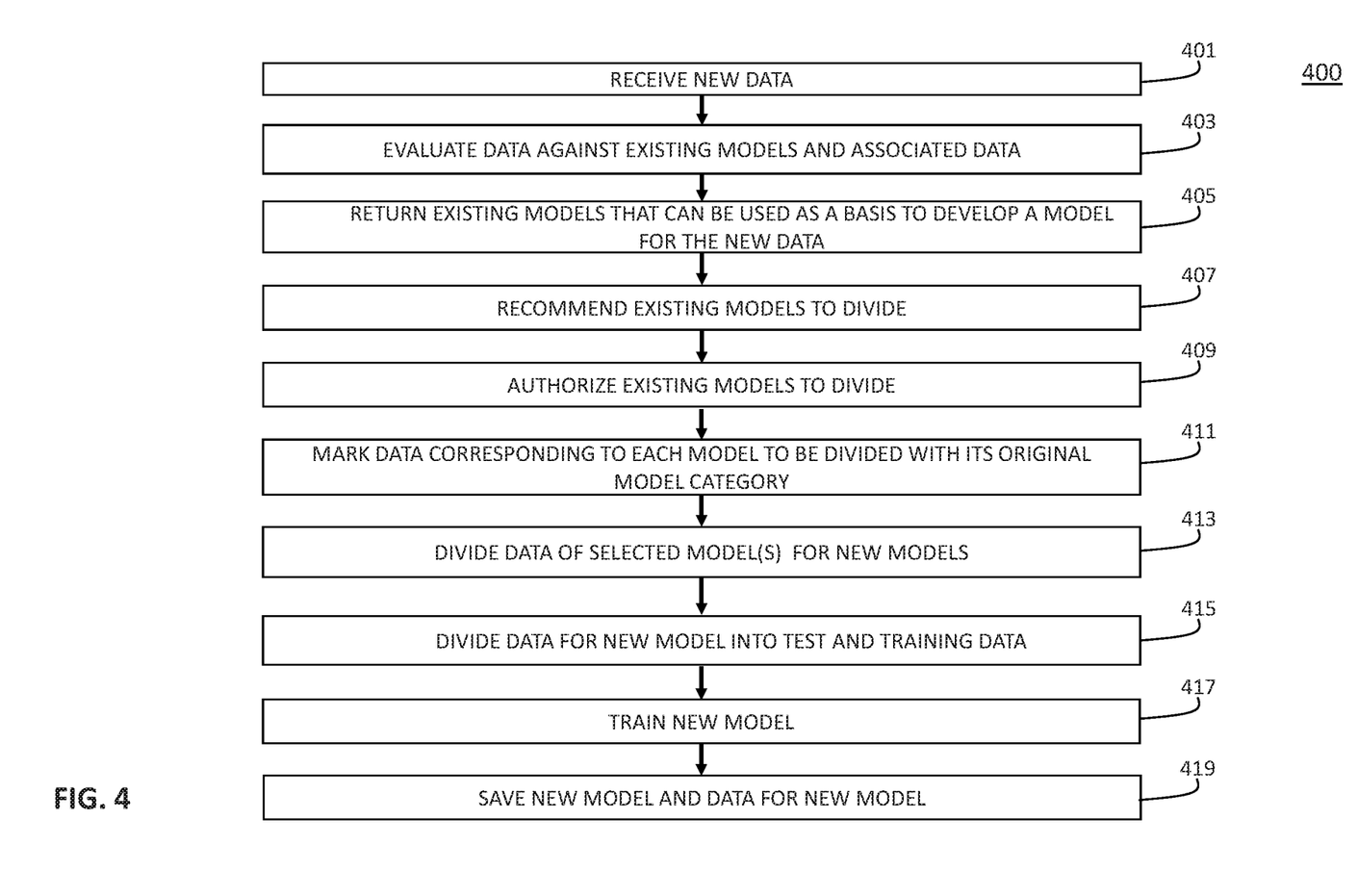
FIG. 4 is a flow diagram of a process for model management wherein splitting of existing models is proposed, according to an exemplary embodiment of the invention.

FIG. 4 is a flow diagram of a process for model management wherein splitting of existing models is proposed, according to an exemplary embodiment of the invention. Referring to FIG. 4, the process 400 includes, at block 401, receiving new data on which to base a model. The received data is evaluated against existing models and associated data (block 403), and based on, for example, probabilistic statistical analysis, existing models that can be used as a basis to develop a model for the new data are returned (block 405). One or more existing models are recommended for division to develop a model for the new data (block 407). At block 409, a user may authorize which existing models to divide. Alternatively, a system may perform the selection of the existing models to divide without user input.

At block 411, the method further includes marking data corresponding to each model to be divided with its original model category, and at block 413, dividing data of the selected model(s) for the new model. The divided data for new model is further divided into test and training data (block 415), and the new model is trained based on the training data (block 417). For example, the model can be tailored using the training data and then evaluated against the test data. The trained new model and data are saved in a database for subsequent use when determining whether any of a plurality of existing models can be used as a model or as a basis to develop a model for received data (block 419).

Figure 5:
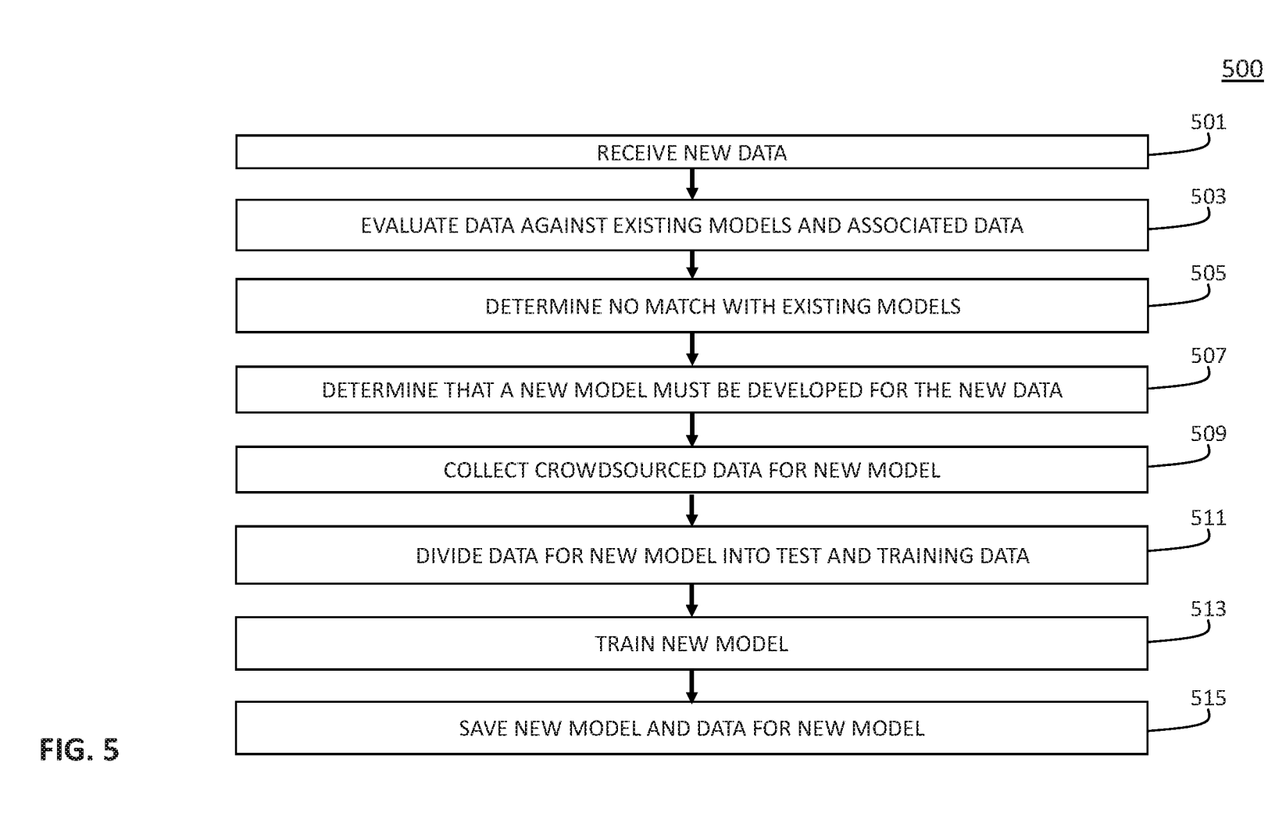
FIG. 5 is a flow diagram of a process for model management wherein a new model is proposed, according to an exemplary embodiment of the invention.

FIG. 5 is a flow diagram of a process for model management wherein a new model is proposed, according to an exemplary embodiment of the invention. Referring to FIG. 5, the process 500 includes, at block 501, receiving new data on which to base a model. The received data is evaluated against existing models and associated data (block 503), and based on, for example, probabilistic statistical analysis, a determination is made that there are no existing models existing models that can be used as a model or as a basis to develop a model for the received data (block 505). At block 507, a determination is made that a new model must be developed for the new data, and the method further comprises, at block 509, collecting crowdsourced data for the new model. The collected crowdsourced data for new model is divided into test and training data (block 511), and the new model is trained based on the training data (block 513). For example, the model can be tailored using the training data and then evaluated against the test data. The trained new model and data are saved in a database for subsequent use when determining whether any of a plurality of existing models can be used as a model or as a basis to develop a model for received data (block 515).

Figure 6:
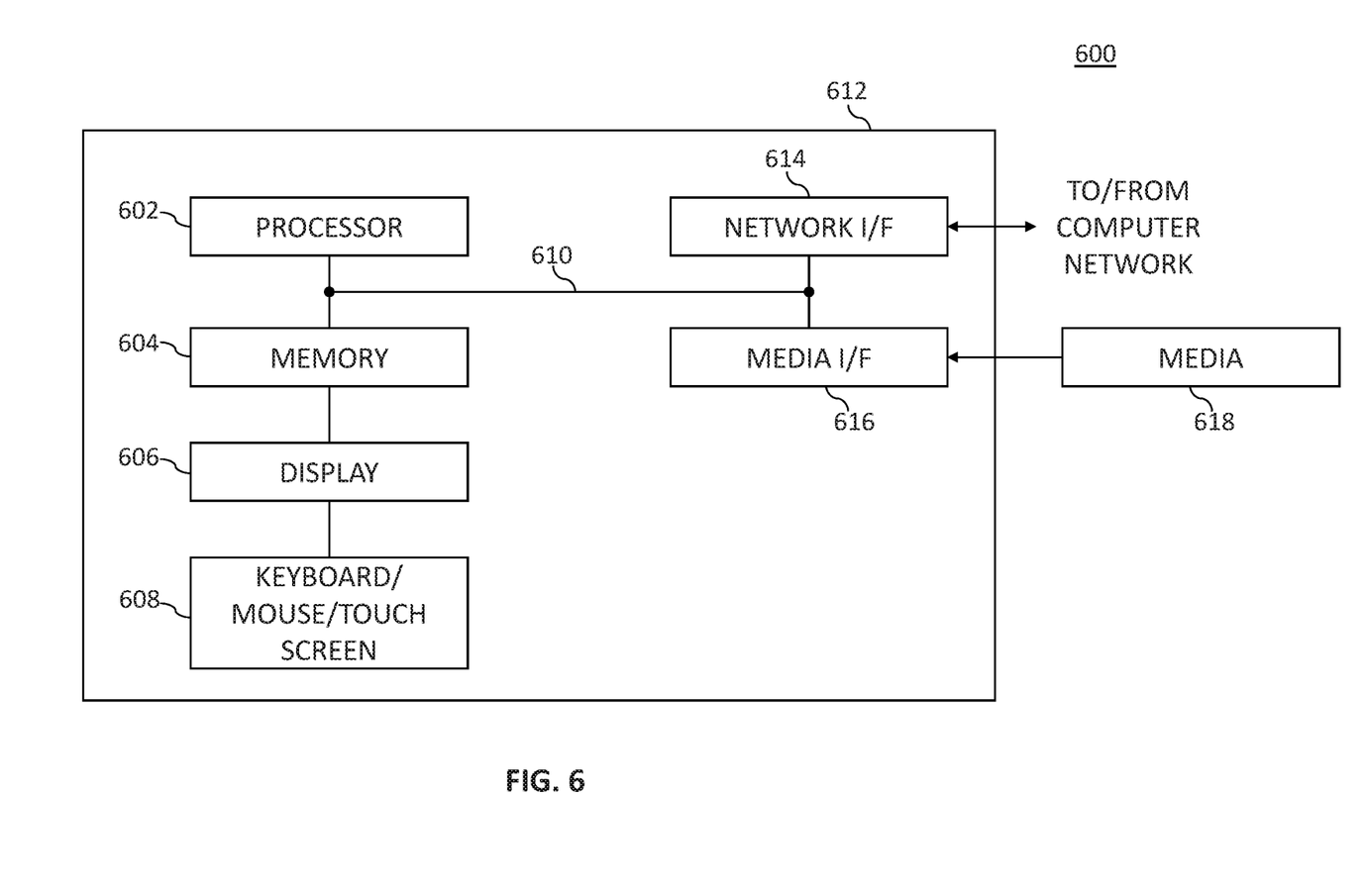
FIG. 6 illustrates a computer system in accordance with which one or more embodiments of the invention can be implemented, according to an exemplary embodiment of the invention.

FIG. 6 illustrates a computer system 600 in accordance with which one or more embodiments of a model management system can be implemented. That is, one, more than one, or all of the components and/or functionalities shown and described in the context of FIGS. 1-5 can be implemented via the computer system depicted in FIG. 6.

By way of illustration, FIG. 6 depicts a processor 602, a memory 604, and an input/output (I/O) interface formed by a display 606 and a keyboard/mouse/touchscreen 608. More or less devices may be part of the I/O interface. The processor 602, memory 604 and I/O interface are interconnected via computer bus 610 as part of a processing unit or system 612 (such as a computer, workstation, server, client device, etc.). Interconnections via computer bus 610 are also provided to a network interface 614 and a media interface 616. Network interface 614 (which can include, for example, transceivers, modems, routers and Ethernet cards) enables the system to couple to other processing systems or devices (such as remote displays or other computing and storage devices) through intervening private or public computer networks (wired and/or wireless). Media interface 616 (which can include, for example, a removable disk drive) interfaces with media 618.

The processor 602 can include, for example, a central processing unit (CPU), a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 602. Memory 604 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 604 may comprise electronic memory such as random access memory (RAM), read-only memory (ROM) or other types of memory, in any combination. The one or more software programs when executed by a processing device such as the processing unit or system 612 causes the device to perform functions associated with one or more of the components/steps of system/methodologies in FIGS. 1-5. One skilled in the art would be readily able to implement such software given the teachings provided herein. Other examples of processor-readable storage media embodying embodiments of the invention may include, for example, optical or magnetic disks.

Still further, the I/O interface formed by devices 606 and 608 is used for inputting data to the processor 602 and for providing initial, intermediate and/or final results associated with the processor 602.

Figure 7:
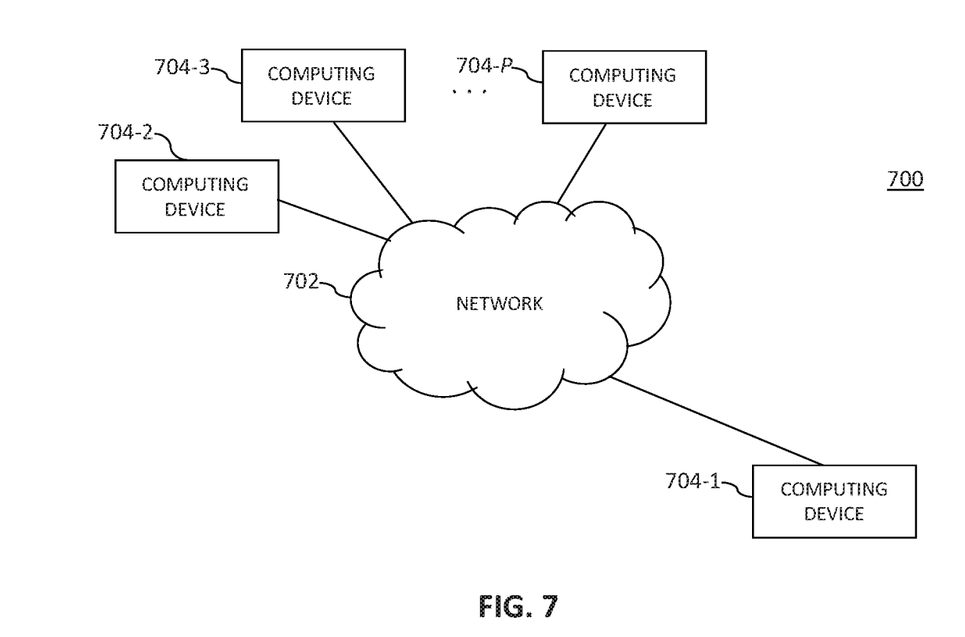
FIG. 7 illustrates a distributed communications/computing network in accordance with which one or more embodiments of the invention can be implemented, according to an exemplary embodiment of the invention.

FIG. 7 illustrates a distributed communications/computing network (processing platform) in accordance with which one or more embodiments of the invention can be implemented. By way of illustration, FIG. 7 depicts a distributed communications/computing network (processing platform) 700 that includes a plurality of computing devices 704-1 through 704-P (herein collectively referred to as computing devices 704) configured to communicate with one another over a network 702.

It is to be appreciated that one, more than one, or all of the computing devices 704 in FIG. 7 may be configured as shown in FIG. 6. It is to be appreciated that the methodologies described herein may be executed in one such computing device 704, or executed in a distributed manner across two or more such computing devices 704. It is to be further appreciated that a server, a client device, a processing device or any other processing platform element may be viewed as an example of what is more generally referred to herein as a "computing device." The network 702 may include, for example, a global computer network such as the Internet, a wide area network (WAN), a local area network (LAN), a satellite network, a telephone or cable network, or various portions or combinations of these and other types of networks (including wired and/or wireless networks).

As described herein, the computing devices 704 may represent a large variety of devices. For example, the computing devices 704 can include a portable device such as a mobile telephone, a smart phone, personal digital assistant (PDA), tablet, computer, a client device, etc. The computing devices 704 may alternatively include a desktop or laptop personal computer (PC), a server, a microcomputer, a workstation, a kiosk, a mainframe computer, or any other information processing device which can implement any or all of the techniques detailed in accordance with one or more embodiments of the invention.

One or more of the computing devices 704 may also be considered a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device, the context of which is apparent from the description.

Additionally, as noted herein, one or more modules, elements or components described in connection with embodiments of the invention can be located geographically-remote from one or more other modules, elements or components. That is, for example, the modules, elements or components shown and described in the context of FIGS. 1-5 can be distributed in an Internet-based environment, a mobile telephony-based environment, a kiosk-based environment and/or a local area network environment. The model management system, as described herein, is not limited to any particular one of these implementation environments. However, depending on the operations being performed by the system, one implementation environment may have some functional and/or physical benefits over another implementation environment.

The processing platform 700 shown in FIG. 7 may comprise additional known components such as batch processing systems, parallel processing systems, physical machines, virtual machines, virtual switches, storage volumes, etc. Again, the particular processing platform shown in this figure is presented by way of example only, and may include additional or alternative processing platforms, as well as numerous distinct processing platforms in any combination. Also, numerous other arrangements of servers, clients, computers, storage devices or other components are possible in processing platform 700.

Furthermore, it is to be appreciated that the processing platform 700 of FIG. 7 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 700 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It is to be appreciated that combinations of the different implementation environments are contemplated as being within the scope of embodiments of the invention. One of ordinary skill in the art will realize alternative implementations given the illustrative teachings provided herein.

The terminology used herein is for the purpose of describing particular embodiments only and is not intended to be limiting of the invention. As used herein, the singular forms "a," "an" and "the" are intended to include the plural forms as well, unless the context clearly indicates otherwise. Additionally, the terms "comprises" and/or "comprising," as used herein, specify the presence of stated values, features, steps, operations, modules, elements, and/or components, but do not preclude the presence or addition of another value, feature, step, operation, module, element, component, and/or group thereof.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for model management, comprising:
receiving data on which to base a model;
evaluating the received data against a plurality of existing models and data associated with each of the plurality of existing models;
determining whether any of the plurality of existing models can be used as the model or as a basis to develop the model for the received data;
providing a user with the existing models that can be used as the model or as a basis to develop the model for the received data;
wherein providing the user with the existing models that can be used as the model or as a basis to develop the model for the received data comprises at least one of: (i) recommending two or more of the existing models that can be merged to develop the model for the received data; and (ii) recommending one or more of the existing models that can be divided to develop the model for the received data;
receiving a selection of one of the two or more of the existing models to be merged and the one or more of the existing models to be divided to develop the model for the received data; and
marking data corresponding to each of the selected models with a corresponding original model category;
wherein the method is performed by at least one computer system comprising at least one memory and at least one processor connected to the memory.

2. The method according to claim 1, wherein the determining comprises performing probabilistic statistical analysis.

3. The method according to claim 2, wherein the probabilistic statistical analysis determines whether a given existing model meets or exceeds a predetermined probability that the given existing model is useable as the model or as a basis to develop the model for the received data.

4. The method according to claim 2, wherein the probabilistic statistical analysis comprises performing feature extraction, natural language processing, one or more natural language understanding processes and one or more machine learning processes.

5. The method according to claim 4, wherein the one or more machine learning processes comprise at least one of maximum entropy classification, conditional random fields and deep learning.

6. The method according to claim 1, further comprising merging the data corresponding to the two or more selected models to be merged.

7. The method according to claim 6, further comprising:
dividing the merged data into test data and training data; and
training the model for the received data.

8. The method according to claim 6, further comprising replacing the two or more selected models with a combined class model based on the merged data.

9. The method according to claim 1, further comprising dividing the data corresponding to the one or more selected models to be divided into a plurality of categories.

10. The method according to claim 9, further comprising:
dividing the divided data into test data and training data; and
training the model for the received data.

11. The method according to claim 1, wherein the recommending of the one or more of the existing models that can be divided is performed using a clustering algorithm.

12. The method according to claim 1, further comprising receiving additional data on which to base an additional model, wherein it is determined that none of the plurality of existing models can be used as the additional model or as a basis to develop the additional model for the received additional data.

13. The method according to claim 12, further comprising;
determining that the additional model for the received additional data be developed independent of the plurality of existing models; and
collecting crowdsourced data for the additional model for the received additional data.

14. The method according to claim 13, further comprising:
dividing the crowdsourced data into test data and training data; and
training the additional model for the received additional data.

15. The method according to claim 1, further comprising generating a dynamic set of labels tracking a provenance of events corresponding to at least one of merging, dividing and creating models over a time period.

16. The method according to claim 15, further comprising using the dynamic set of labels to retrieve provenance information associated with the at least one of merged, divided and created models.

17. The method according to claim 1, wherein the recommending of the two or more of the existing models that can be merged or the recommending of the one or more of the existing models that can be divided comprises determining that a correlation between the received data and data associated with each of the existing models in the recommendation is at or greater than a given confidence threshold.

18. A system for model management, comprising:
one or more processing devices operatively connected via a communications network;
an input/output module, implemented by the one or more processing devices, wherein the input/output module is configured to receive data on which to base a model;
a model controller, implemented by the one or more processing devices and operatively connected to the input/output module, wherein the model controller is configured to:
receive the data on which to base the model from the input/output module;
evaluate the received data against a plurality of existing models and data associated with each of the plurality of existing models; and
determine whether any of the plurality of existing models can be used as the model or as a basis to develop the model for the received data;
wherein the plurality of existing models and data associated with each of the plurality of existing models are stored in a database operatively connected to and accessible by the model controller; and
wherein the model controller is further configured to:
provide a user, via the input/output module, with the existing models that can be used as the model or as a basis to develop the model for the received data;
at least one of: (i) recommend two or more of the existing models that can be merged to develop the model for the received data; and (ii) recommend one or more of the existing models that can be divided to develop the model for the received data;
receive a selection of one of the two or more of the existing models to be merged and the one or more of the existing models to be divided to develop the model for the received data; and
mark data corresponding to each of the selected models with a corresponding original model category.

19. The system according to claim 18, wherein:
the model controller is further configured to perform probabilistic statistical analysis to determine whether any of the plurality of existing models can be used as the model or as a basis to develop the model for the received data; and
wherein the probabilistic statistical analysis determines whether a given existing model meets or exceeds a predetermined probability that the given existing model is useable as the model or as a basis to develop the model for the received data.

20. The system according to claim 18, wherein:
the model controller is configured to receive additional data on which to base an additional model from the input/output module;
the model controller determines that none of the plurality of existing models can be used as the additional model or as a basis to develop the additional model for the received additional data, and that the additional model for the received additional data be developed independent of the plurality of existing models; and
the system further comprises a trainer, implemented by the one or more processing devices and operatively connected to the model controller, wherein the trainer is configured to collect crowdsourced data for the additional model for the received additional data.

21. The system according to claim 18, wherein the model controller is configured to merge the data corresponding to the two or more selected models to be merged.

22. The system according to claim 21, wherein the model controller is configured to replace the two or more selected models with a combined class model based on the merged data.

23. An article of manufacture comprising a processor-readable storage medium having encoded therein executable code of one or more software programs, wherein the one or more software programs when executed by one or more processing devices implement the steps of:
receiving data on which to base a model;
evaluating the received data against a plurality of existing models and data associated with each of the plurality of existing models;
determining whether any of the plurality of existing models can be used as the model or as a basis to develop the model for the received data;
providing a user with the existing models that can be used as the model or as a basis to develop the model for the received data;
wherein providing the user with the existing models that can be used as the model or as a basis to develop the model for the received data comprises at least one of:
(i) recommending two or more of the existing models that can be merged to develop the model for the received data; and (ii) recommending one or more of the existing models that can be divided to develop the model for the received data;

receiving a selection of one of the two or more of the existing models to be merged and the one or more of the existing models to be divided to develop the model for the received data; and marking data corresponding to each of the selected models with a corresponding original model category.

\* \* \* \* \*